(12) United States Patent
Wu

(10) Patent No.: US 7,150,435 B2
(45) Date of Patent: Dec. 19, 2006

(54) TYPE AIRCRAFT

(76) Inventor: Yunlong Wu, No.502, Unit 4, Building 11, Cai He east zone, Hangzhou City, 310016, Zhejiang Province (CN)

( * ) Notice: Subject to any disclaimer, the term of this patent is extended or adjusted under 35 U.S.C. 154(b) by 0 days.

(21) Appl. No.: 10/774,460

(22) Filed: Feb. 10, 2004

(65) Prior Publication Data

US 2004/0245392 A1    Dec. 9, 2004

(30) Foreign Application Priority Data

Apr. 17, 2003    (CN)    ................................ 03 1 22707

(51) Int. Cl.
*B64C 3/00*    (2006.01)
(52) U.S. Cl. ...................... 244/200; 244/130
(58) Field of Classification Search ................ 244/200, 244/130, 105, 106
See application file for complete search history.

(56) References Cited

U.S. PATENT DOCUMENTS

| | | | | |
|---|---|---|---|---|
| 1,507,588 A | * | 9/1924 | Davenport | ................... 244/36 |
| 1,785,879 A | * | 12/1930 | Stout | ........................... 244/87 |
| 1,851,194 A | * | 3/1932 | Ledwinka et al. | .......... 244/119 |
| 2,349,584 A | * | 5/1944 | Arnstein et al. | ............ 244/106 |
| 3,029,046 A | * | 4/1962 | Blaes et al. | ................. 244/105 |
| 4,932,612 A | * | 6/1990 | Blackwelder et al. | ....... 244/207 |

FOREIGN PATENT DOCUMENTS

| | | | | | |
|---|---|---|---|---|---|
| DE | 558802 | * | 2/1931 | ................. | 244/106 |
| FR | 531444 | * | 1/1922 | ................. | 244/106 |
| GB | 517775 | * | 2/1940 | ................. | 244/106 |

\* cited by examiner

*Primary Examiner*—Galen Barefoot
(74) *Attorney, Agent, or Firm*—Rabin & Berdo, P.C.

(57) ABSTRACT

The present invention relates to a new type aircraft. The aircraft includes the airframe and wing, characterized in that the transverse section of airframe has an oblate (oval) profile with corrugated area on the ventral of airframe; the aircraft has uneven friction areas on the underside surface of wing; there are fireproof & anti-wear layers on the envelopes of airframe ventral and friction areas; the said fireproof & anti-wear layers have tire rubber material. When the aircraft is in motion with high velocity, the friction with air is increased, which produces bigger lift with more aircraft load and shortened takeoff & landing distance of aircraft, meanwhile the safe peril to aircraft caused by the shear transformation of wind in flight is prevented effectively; the fireproof & anti-wear layers on the envelopes of airframe ventral and friction areas have an effect on higher anti-wear proof and longer aircraft life.

2 Claims, 1 Drawing Sheet

TYPE AIRCRAFT

FIELD OF THE INVENTION

The present invention relates to an aircraft, and especially relates to a unique structural new type of aircraft.

BACKGROUND OF THE INVENTION

It has been over 100 years since the Wright brothers in U.S. invented an aircraft whose theory of aircraft lift was based on the wing structure of a curved top & flat bottom. With this wing structure, the resistance was decomposed to a downward "ballast force" in aircraft high velocity flight, so the safety and reliability in high velocity flight was ensured. The ballast force is proportional to the flight velocity and the aircraft could keep the smooth & effective controlling even in high velocity flight. The aircraft, however, may loop the loop and even flip over in the sky, in this way, the wing structure having a curved top & flat bottom produced no so called "lift force" but a downward "ballast force" with which the high velocity flight of aircraft was ensured in practice. And this point may be clear from the flight orbit of aircraft. In view of this, the invention put forwards a new lift theory absolutely different from the one of the Wright brothers'.

BRIEF DESCRIPTION OF THE INVENTION

This invention is based on repudiating the lift theory raised by the Wright brothers in U.S. and establishing a absolutely new "acting force & reacting force" lift theory, and supplies a new type aircraft whose lift force is increased in flight with benefits of more load, shortened takeoff & landing distance and decreased safe peril to aircraft caused by the shear transformation of wind in flight.

The purpose of this invention is realized through the following technologies. The new type aircraft includes the airframe and wing, characterized in that the transverse section of airframe has an oblate (oval) profile with corrugated area on the ventral of airframe.

Said new type aircraft has uneven friction areas on the underside surface of wing; There are fireproof & anti-wear layers on the envelopes of airframe ventral and friction areas.

In said new type aircraft, the said fireproof & anti-wear layers have tire rubber material.

In the new type aircraft supplied by the present invention, owing to the airframe has an oblate (oval) profile with corrugated area on the ventral of airframe, when the aircraft is in motion with high velocity, the friction area with air is increased, which produces bigger lift with more aircraft load and shortened takeoff & landing distance, meanwhile the safe peril to aircraft caused by the shear transformation of wind in flight is prevented effectively; the fireproof & anti-wear layers on the envelopes of airframe ventral and friction areas have an effect on higher anti-wear and longer aircraft life.

BRIEF DESCRIPTION OF THE APPENDED DRAWINGS

DESCRIPTION OF FIGURE MARKS

1: airframe, 1-1: corrugated area, 2: wing, 2-1: friction area, 3: fireproof & anti-wear layer.

DETAILED DESCRIPTION OF THE INVENTION

Figure 1:
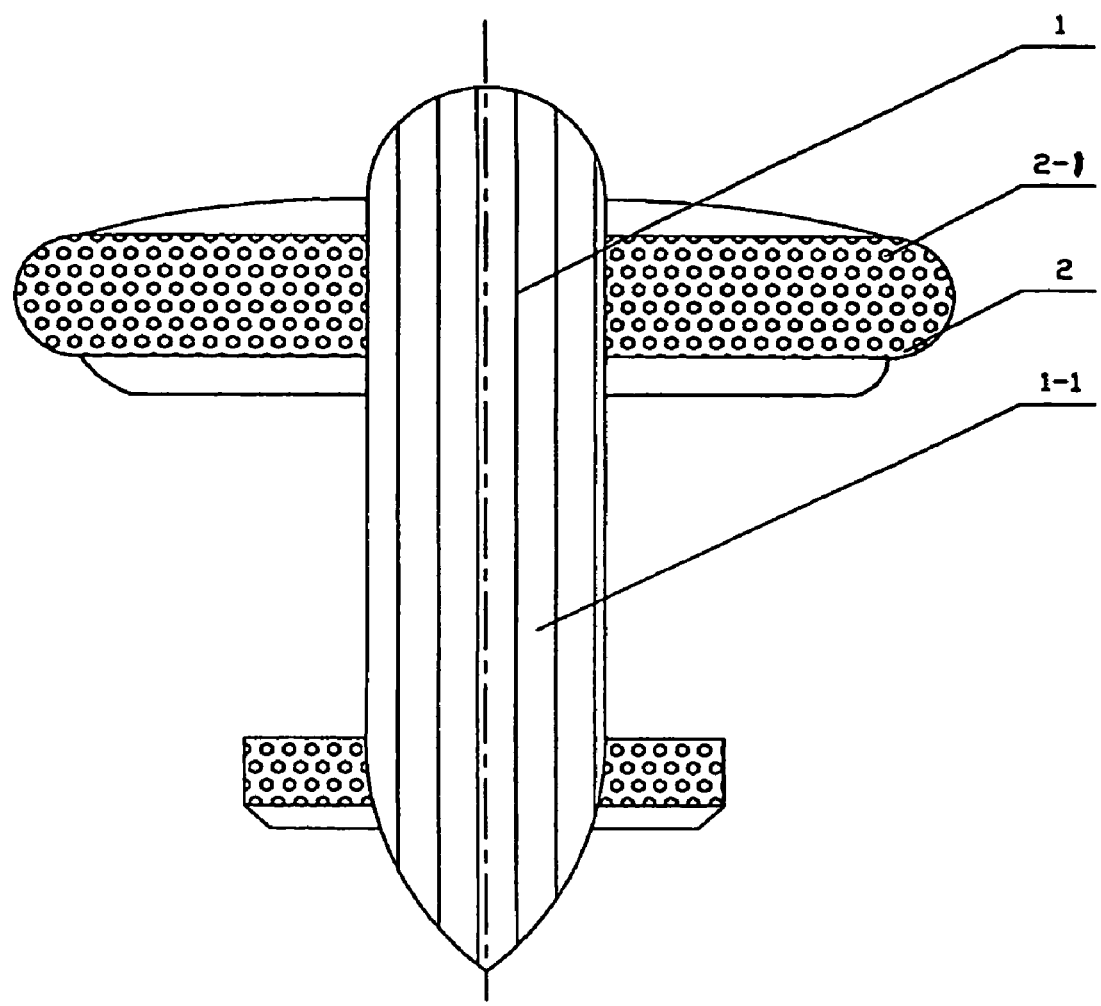
FIG. 1 is a structural illustrative view showing the new type aircraft in embodiment 1.
Figure 2:
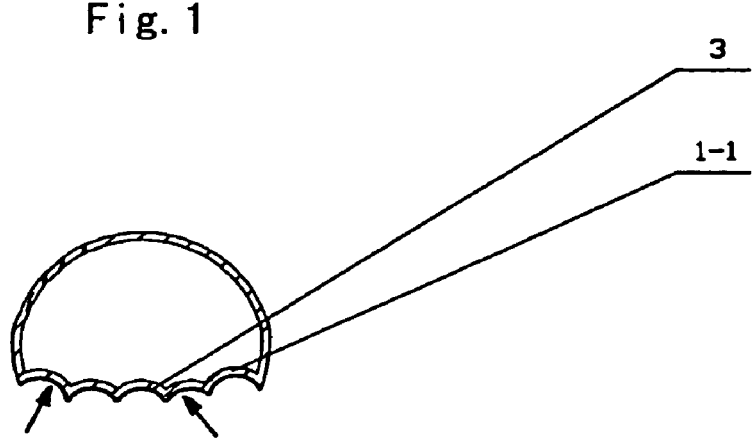
FIG. 2 is a transverse section illustrative view of FIG. 1.

Next, a further description will be made as to the new type aircraft provided by present invention with the Specification Figures:

Embodiment: The aircraft profile as FIG. 1 is made with a corrugated area 1-1 on the ventral of the airframe 1. The airframe 1 has an oblate (oval) profile as FIG. 2. There are uneven friction areas 2-1 on the underside surface of wing 2 and the friction areas 2-1 are for increasing the friction factor in flight. There are fireproof & anti-wear layers 3 of 0.2–0.3 cm thick on the envelopes of the ventral of airframe 1 and friction areas 2, and the fireproof & anti-wear layers are tire rubber material of high carbon contents. The aircraft produces big friction with air in high velocity flight; for the huge weight of aircraft and based on the "acting force & reacting force" relationship in the Newton Mechanics, the reacting force rubbing with air under wing 2 and ventral is acting onto the airframe 1 as FIG. 2 shows and the lift is increased to realize this invention purpose.

We claim:

1. An aircraft, comprising:
   an airframe having a longitudinally-extending corrugated area disposed along an entire length of said airframe and at a ventral thereof, a transverse section of said airframe having an oblate oval profile, the ventral envelopes having fireproof and anti-wear layers; and
   a wing connected to said airframe, said wing having an uneven friction area located solely on an underside surface thereof, said friction area having fireproof and anti-wear layers, said uneven friction area causing an increase in a friction factor on the underside surface of said wing to thereby increase a lift force acting on the underside surface of said wing, when said aircraft is in flight.

2. An aircraft according to claim 1, wherein the fireproof and anti-wear layers have tire rubber material.

* * * * *